United States Patent
Liao et al.

(10) Patent No.: US 12,052,504 B2
(45) Date of Patent: Jul. 30, 2024

(54) MONITOR DEVICE

(71) Applicant: Cheng Yuan Liao, New Taipei (TW)

(72) Inventors: Cheng Yuan Liao, New Taipei (TW); Fu Sheng Chang, New Taipei (TW)

(73) Assignee: Cheng Yuan Liao, New Taipei (TW)

( * ) Notice: Subject to any disclaimer, the term of this patent is extended or adjusted under 35 U.S.C. 154(b) by 295 days.

(21) Appl. No.: 17/809,910

(22) Filed: Jun. 30, 2022

(65) Prior Publication Data
US 2024/0007750 A1    Jan. 4, 2024

(51) Int. Cl.
| | |
|---|---|
| *H04N 23/695* | (2023.01) |
| *F16H 1/22* | (2006.01) |
| *F16H 19/08* | (2006.01) |
| *G01J 5/04* | (2006.01) |
| *G01J 5/08* | (2022.01) |
| *H04N 23/50* | (2023.01) |
| *H04N 23/90* | (2023.01) |

(52) U.S. Cl.
CPC ........... *H04N 23/695* (2023.01); *F16H 1/225* (2013.01); *F16H 19/08* (2013.01); *G01J 5/047* (2013.01); *G01J 5/0859* (2013.01); *H04N 23/50* (2023.01); *H04N 23/90* (2023.01); *F16H 2019/085* (2013.01)

(58) Field of Classification Search
CPC ...... H04N 23/695; H04N 23/50; H04N 23/90; H04N 23/23; G01J 5/047; G01J 5/0859; F16H 2019/085; F16H 37/12; F16M 11/10; F16M 11/18; F16M 11/2014
See application file for complete search history.

(56) References Cited

U.S. PATENT DOCUMENTS

| | | | |
|---|---|---|---|
| 10,867,193 B1* | 12/2020 | Hansen | G06V 10/507 |
| 2016/0191813 A1* | 6/2016 | Wu | H04N 23/58 |
| | | | 348/159 |
| 2018/0330175 A1* | 11/2018 | Corcoran | G06V 10/147 |
| 2019/0068892 A1* | 2/2019 | Yasutake | H04N 23/55 |
| 2019/0191059 A1* | 6/2019 | Park | H04N 23/90 |
| 2020/0236340 A1* | 7/2020 | Lee | H04N 23/698 |
| 2021/0058556 A1* | 2/2021 | Kim | H04N 23/54 |
| 2021/0405518 A1* | 12/2021 | Lablans | H04N 23/69 |

* cited by examiner

*Primary Examiner* — Twyler L Haskins
*Assistant Examiner* — John H Morehead, III
(74) *Attorney, Agent, or Firm* — Wang Law Firm, Inc.

(57) ABSTRACT

A monitor device is provided, including: a fixing seat, for fixing to a structure; a casing, with an accommodating space, upper end of the longitudinal axis of the casing rotatably connected to the fixing seat; a first optoelectronic device, disposed on the lower end of the casing; a second photoelectric device and a third photoelectric device, respectively rotatably disposed at a first position and a second position outside the casing; a transmission mechanism, disposed in the accommodating space of the casing, and the transmission mechanism including: an angle rotation mechanism, connected to the fixing seat to drive the casing to rotate in a first direction relative to the fixing seat; and a second angle rotation mechanism connected to and driving the first, the second and the third optoelectronic device to rotate synchronously in a second direction; wherein the first direction and the second direction are orthogonal to each other.

7 Claims, 9 Drawing Sheets

MONITOR DEVICE

BACKGROUND OF THE INVENTION

1. Field of the Invention

The present invention relates generally to a monitor device suitable for an industrial environment, and more particularly, to a monitor device able to make the overall volume more compact and concise compared to conventional products, and able to drive three optoelectronic devices rotating synchronously in the first direction and/or in the second direction.

2. The Prior Arts

With the progress of society and the development of science and technology, monitors have become a part of daily life, and are widely installed in various places such as traffic intersections, homes, businesses, offices and factories to monitor the environment and prevent potential accident occurred.

Since most of the monitors are installed outdoors, the monitors are exposed to sunlight, rain and wind under long-term outdoor use, which is easy to cause corrosion and damage to the monitors, and outdoor sand, dust or dirt is also easy to accumulate in the crevices or the lens, which affects the use of the monitor. For high-grade industrial monitors used in harsh environments, explosion-proof performance is also required to prevent the monitor from being damaged when a strong explosion occurs in the industrial environment, thereby protecting the images captured by the monitor. Therefore, for high-grade industrial monitor devices, the monitor is generally installed in a protective casing to prevent the monitor from being directly exposed to sunlight, rain, man-made damage, or being affected by strong explosions in the environment.

In order to monitor the surrounding environment as much as possible, most monitors have rotation functions in the horizontal direction and in the vertical direction, and in order to obtain clear images at night or in poor light environments, some monitors are equipped with both cameras and thermal imaging cameras (collectively referred to as "photoelectric devices"). For example, a conventional monitor sets a camera and an infrared thermal imager together in a transparent glass cover. However, when infrared rays are projected from the inside of the glass cover, the reflection and refraction of the glass cover will affect the acquisition of the camera. Therefore, In order to reduce the adverse effect, the glass cover of the monitor is usually made of germanium glass; however, the hardness and strength of germanium glass cannot meet the harsh industrial explosion-proof standards.

In order to solve the aforementioned problems, a conventional monitor equipped with two types of photoelectric devices, such as a camera and an infrared thermal imager, is configured by disposing the two photoelectric devices on opposite sides of the outer casing of the monitor, and by a transmission mechanism disposed inside the casing drives the casing to rotate in the horizontal direction, and drives the two optoelectronic devices to rotate in the vertical direction, as shown in previous patent documents such as China Patent No. CN 213817900 U.

In addition to the aforementioned two optoelectronic devices, there is a practical need to equip the monitor with a third optoelectronic device, such as a wide-angle camera, a telephoto camera, a light, etc. The device must be driven to rotate synchronously with the first and second optoelectronic devices, which inevitably makes the overall mechanism large and complicated.

SUMMARY OF THE INVENTION

A primary objective of the present invention is to provide a monitor device that controls three optoelectronic devices to rotate synchronously by a simple and compact transmission mechanism.

The monitor device provided by the present invention includes: a fixing seat, for fixing to a structure body; a casing, having an accommodating space, with an upper end of a longitudinal axis of the casing rotatably connected to a lower end of the fixing seat, and a lower end of the longitudinal axis of the casing disposed with a first optoelectronic device; a base, fixedly disposed in the accommodating space of the casing; a transmission shaft, disposed on the base pivotably with horizontal axis; a second optoelectronic device, fixedly disposed at one end of the transmission shaft, so that the second optoelectronic device being rotatably located at a first position outside the casing; a third optoelectronic device, fixedly disposed at the other end of the transmission shaft, so that the third optoelectronic device being rotatably located at a second position outside the casing; a transmission mechanism, disposed in the accommodating space of the casing, and the transmission mechanism comprising: a first angle rotation mechanism, disposed on one side of the base, the first angle rotation mechanism having a first motor, the first motor being connected to the fixing seat through a first gear mechanism to drive the casing rotate back-and-forth in a first direction with respect to the fixing seat; and a second angle rotation mechanism, disposed on the base, the second angle rotation mechanism having a second motor, and the second motor being to the transmission shaft through a second gear mechanism, and connected to the first optoelectronic device through the transmission shaft so that the second motor being able to drive the first optoelectronic device, the second optoelectronic device and the third optoelectronic device synchronously to rotate back-and-forth in a second direction, wherein the first motor and the second motor being disposed above the base in parallel with each other, and wherein the first direction and the second direction are orthogonal to each other. With the aforementioned structure of the monitor, all the mechanisms for driving the synchronous rotation of the three optoelectronic devices can be integrated and concentrated in the cylindrical casing, so that the appearance of the entire monitor is more compact than the conventional monitor.

Preferably, the first direction is a horizontal direction, and the second direction is a vertical direction.

In a preferred embodiment, the first optoelectronic device comprises a first camera and a glass cover, the glass cover is disposed at the lower end of the casing, and the first camera is disposed in the glass cover.

Preferably, the first gear mechanism comprises: a first driving gear set connected to a drive shaft of the first motor; a first idler gear connected to a first worm screw disposed on the base, and the first idler gear meshing with the first driving gear set; a first driven gear is connected to a first decoder disposed on the base, and the first driven gear meshing with the first driving gear set; a first worm gear, disposed on the fixing seat and engaged with the first worm screw.

Alternatively, the first gear mechanism may comprise: a first driving gear connected to the drive shaft of the first motor; a first idler gear connected to a first worm screw disposed on the base, and the a first idler gear meshing with the first driving gear; a first driven gear is connected to a first decoder disposed on the base, and the first driven gear meshing with the first driving gear; and a first worm gear is disposed on the fixing seat and engaged with the first worm screw.

Preferably, the second gear mechanism comprises: a second driving gear set connected to a drive shaft of the second motor; a second idler gear connected to a second worm screw disposed on the base, and the second idler gear meshing with the second driving gear set; a second driven gear connected to a second decoder disposed on the base, and the second driven gear meshing with the second driving gear set; a second worm gear fixedly disposed on the transmission shaft and engaged with the second worm screw.

Alternatively, the second gear mechanism may comprise: a second driving gear connected to a drive shaft of the second motor; a second idler gear connected to a second worm screw disposed on the base, and the second idler gear meshing with the second driving gear; a second worm gear fixedly disposed on the drive shaft and meshing with the second worm screw; and a second driven gear is connected to a second decoder disposed on the base, and the second driven gear meshing with the second worm gear.

Preferably, the second angle rotation mechanism further comprises a driving pulley, a belt and a driven pulley, the driving pulley being fixedly disposed on the transmission shaft, and the driven pulley being connected to the first camera, the belt connecting the driving pulley and the driven pulley, so that the transmission shaft driving the second optoelectronic device and the three optoelectronic devices to rotate in the second direction, and through the driving pulley, the belt and the driven pulley, the first camera rotating in the second direction.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
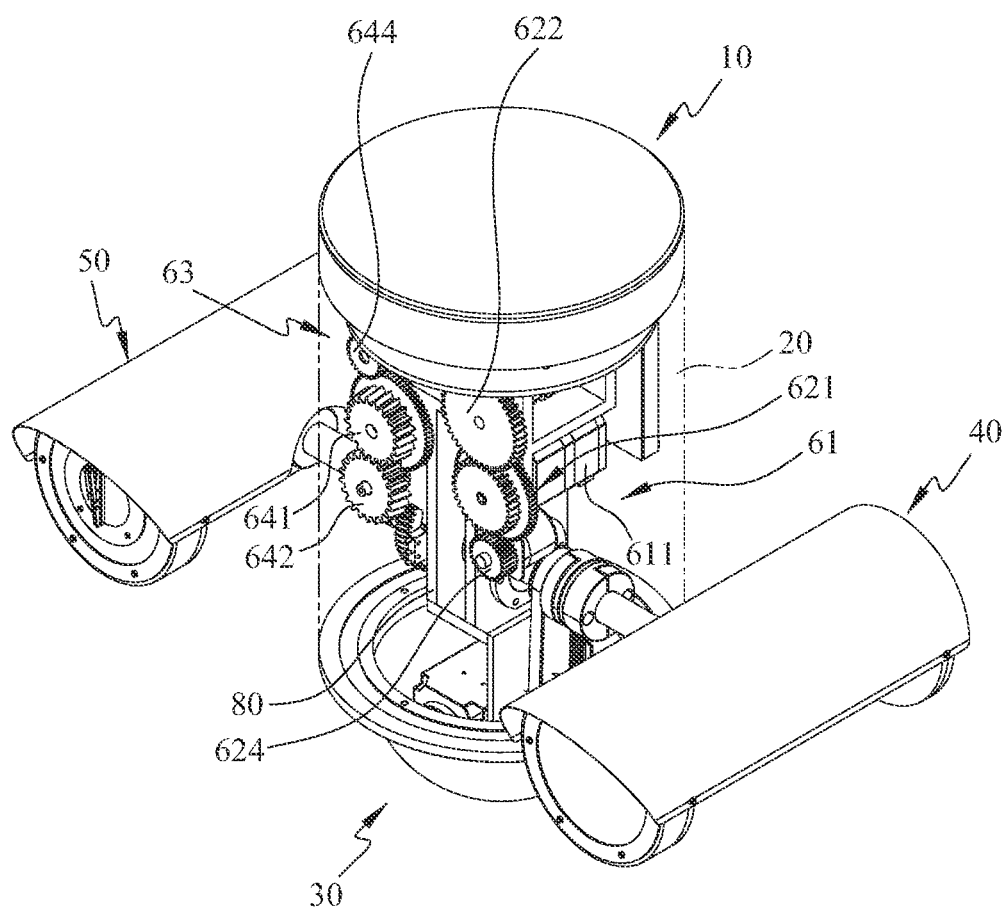
FIG. 1 is a three-dimensional assembled view of a monitor device according to a first embodiment of the present invention.
Figure 2:
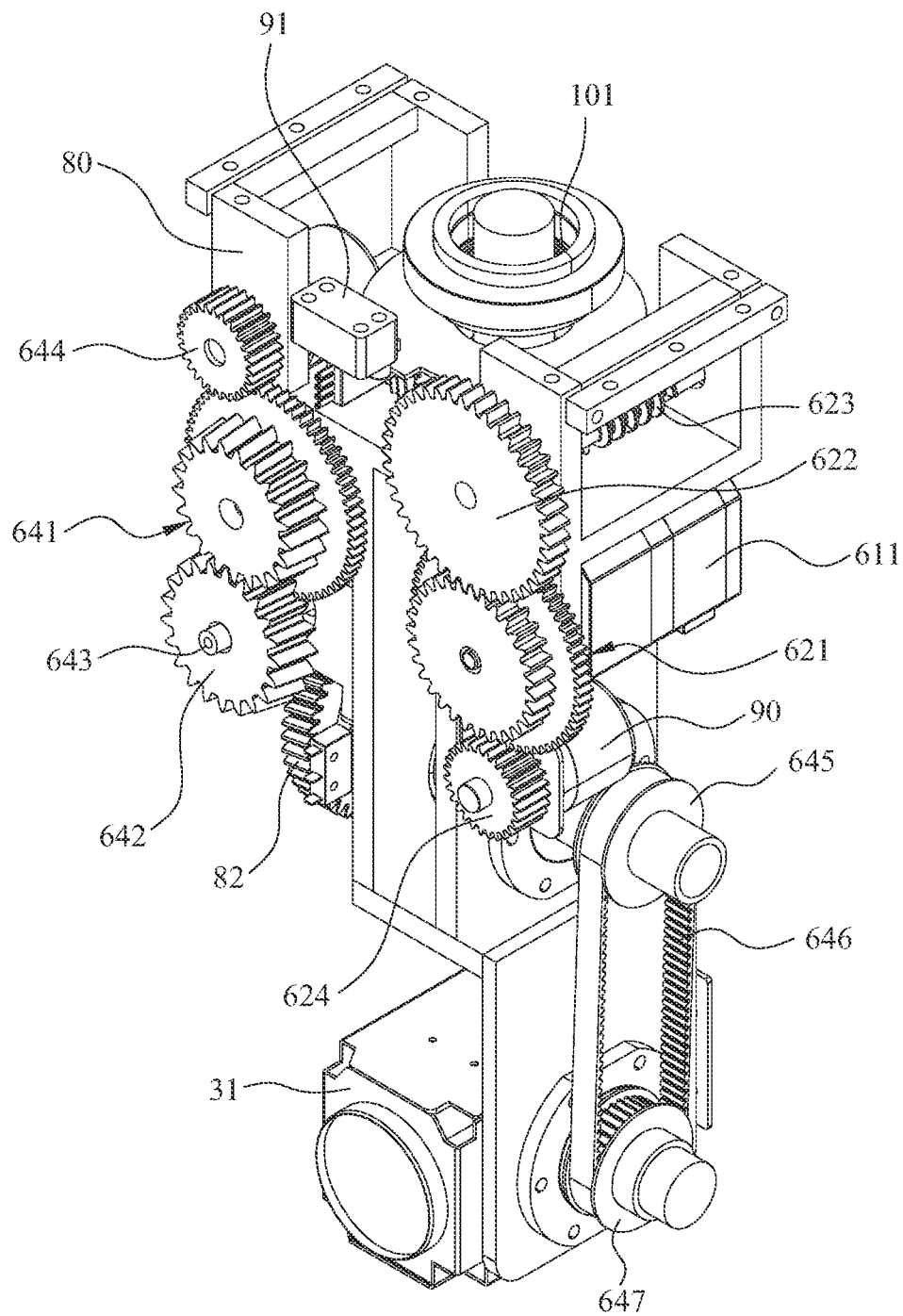
FIG. 2 is a perspective view of the transmission mechanism of the monitor device according to the first embodiment of the present invention.
Figure 3:
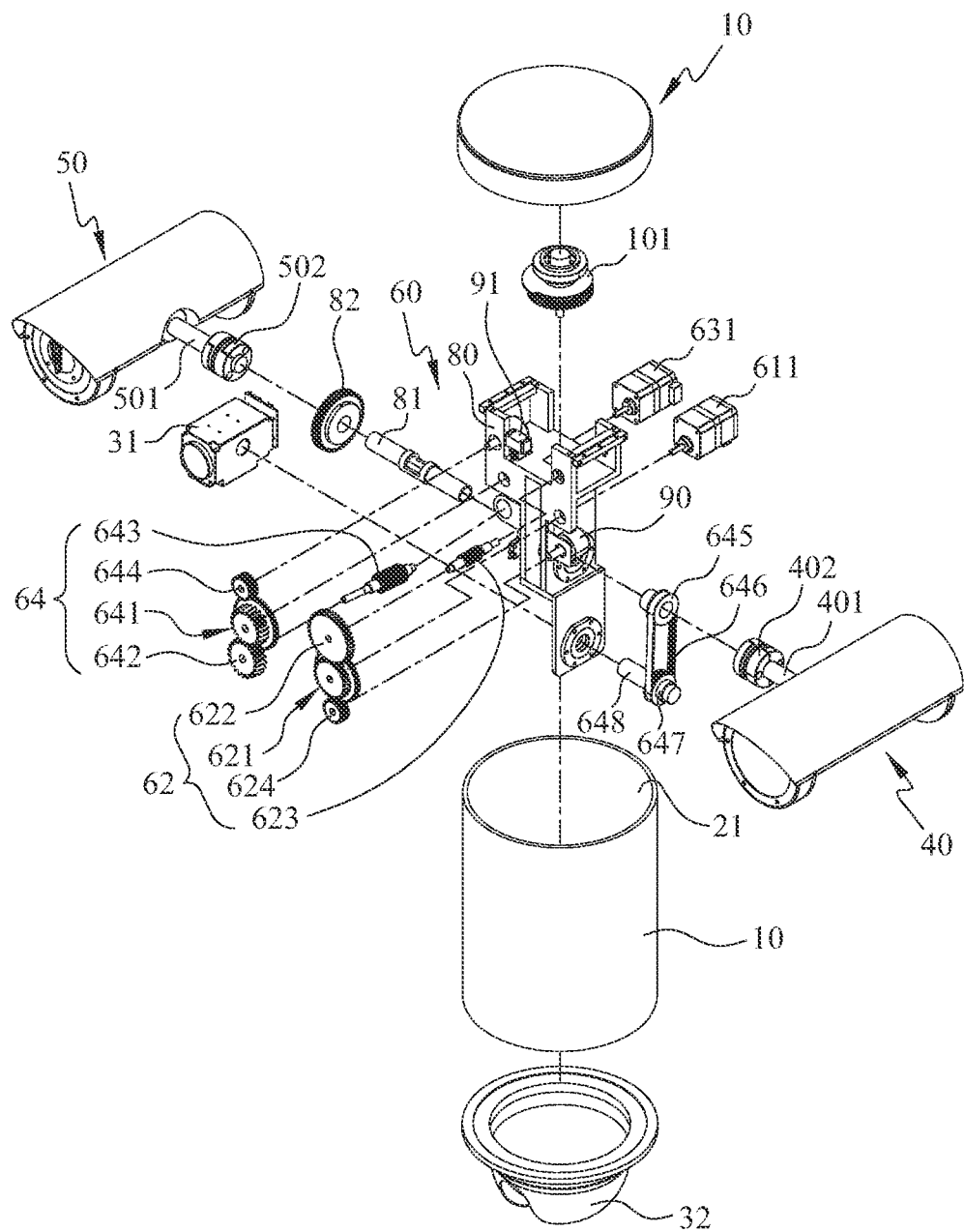
FIG. 3 is an exploded perspective view showing the component assembly relationship of the monitor device according to the first embodiment of the present invention.

The accompanying drawings are included to provide a further understanding of the invention, and are incorporated in and constitute a part of this specification. The drawings illustrate embodiments of the invention and, together with the description, serve to explain the principles of the invention.

As shown in FIG. 1 to FIG. 4, the monitor device according to the first embodiment of the present invention includes a cylindrical casing 20, the upper end of the casing 20 is rotatably connected to a fixing seat 10, a first optoelectronic device 30 is fixedly arranged at the lower end of the casing 20, and a second optoelectronic device 40 and a third optoelectronic device 50 are respectively disposed on opposite sides of the casing 20; wherein the fixing seat 10 is used for fixing to roofs, beams or any suitable structure so that the monitor can monitor a wide range of the surrounding environment.

Figure 4:
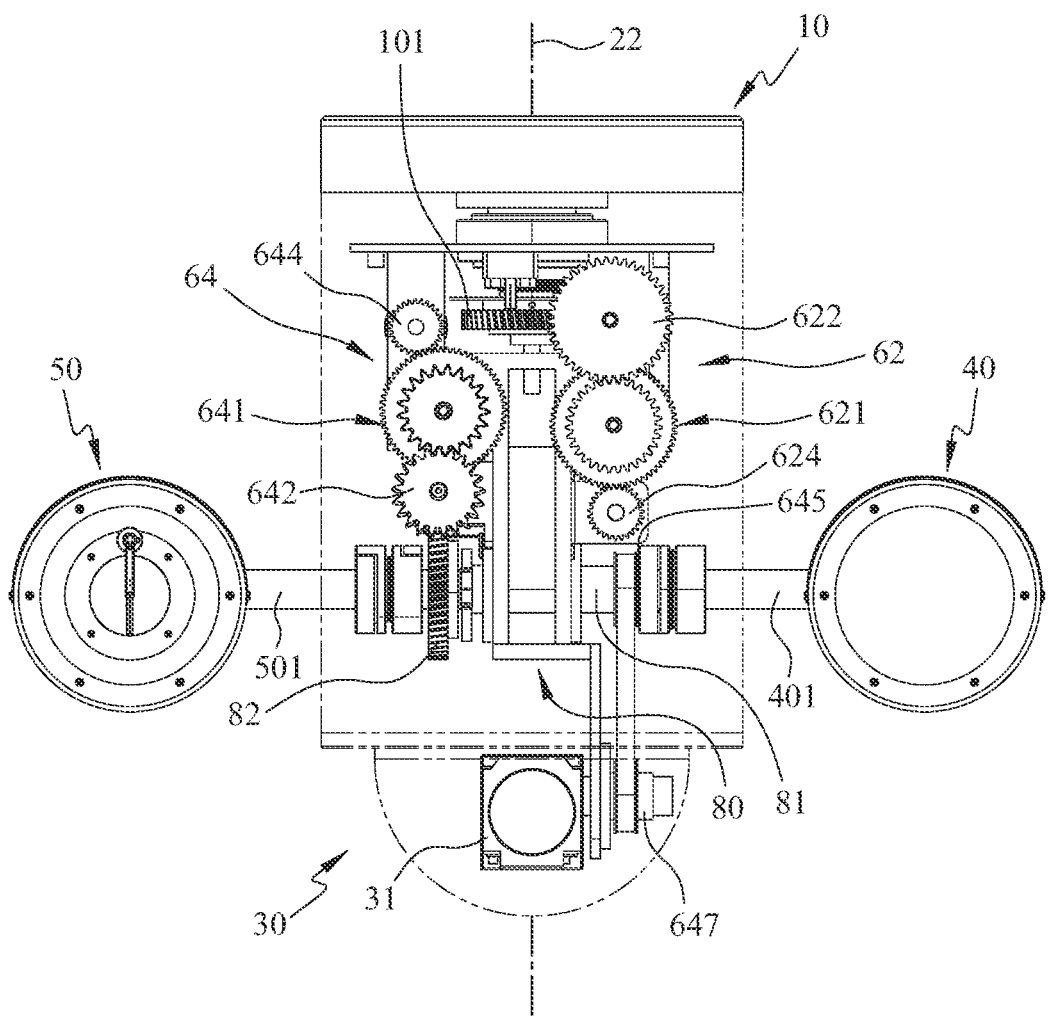
FIG. 4 is a schematic front view showing the structure of the monitor device according to the first embodiment of the present invention.

The casing 20 can be a cylindrical body, a rectangular body or a polygonal body. In a preferred embodiment of the present invention, there is a cylindrical accommodating space 21 inside the casing 20 of the cylindrical body, so as to have a virtual longitudinal axis 22 in the center of the cylindrical body (as shown in FIG. 4). The upper end of the casing 20 is rotatably connected to the fixing seat 10. Specifically, between the casing 20 and the fixing seat 10, a shaft and a bearing (not shown in the figure) can be used in conjunction to make the casing 20 and the fixing seat 10 fit. The casing 20 and the fixing seat 10 can rotate with respect to each other.

In the first embodiment of the present invention, the first optoelectronic device 30 may include a first camera 31 and a glass cover 32, the glass cover 32 is disposed at the lower end of the casing 20, and the first camera 31 is disposed in the glass cover 32. The first camera 31 can be a wide-angle camera, a telephoto camera or a camera with other special functions according to actual application.

The second optoelectronic device 40 is rotatably disposed at a first position 23 outside the casing 20, such as the left side shown in FIG. 1; the third optoelectronic device 50 is rotatably disposed at a second position 24 outside the casing 20, such as the right side shown in FIG. 1.

A transmission mechanism 60 is disposed in the accommodating space 21 of the casing 20 to drive the casing 20 to rotate horizontally relative to the fixing seat 10, and to drive the first optoelectronic device 30, the second optoelectronic device 40 and the third optoelectronic device 30. The optoelectronic device 50 rotates in the vertical direction (i.e., the pitch and elevation directions) at the same time. The transmission mechanism 60 includes a base 80, a first angle rotation mechanism 61 and a second angle rotation mechanism 63. The base 80 is fixedly disposed in the accommodating space 21 of the casing 2, and the first angle rotation mechanism 61 is disposed on the base 80 and connected to the fixing seat 10 to drive the casing 20 with respect to the fixing seat 10 to rotate back-and-forth in a first direction 70. The second angle rotation mechanism 63 is disposed on the base 80 and connected to the first optoelectronic device 30, the second optoelectronic device 40, and the third optoelectronic device 50 to drive the first optoelectronic device 30, the second optoelectronic device 40, and the third optoelectronic device to rotate synchronously back-and-forth in a second direction 71. The first direction 70 and the second direction 71 are respectively horizontal and vertical directions that are orthogonal to each other.

The transmission mechanism 60 of the first embodiment further includes a transmission shaft 81 pivotally and horizontally disposed on the base 80, and the two ends of the transmission shaft 81 extend out of the casing 20 through holes disposed on both sides of the casing the second optoelectronic device 40 and the third optoelectronic device 50 are respectively disposed with a second shaft 401 and a third shaft 501 extending laterally, and the ends of the second shaft 401 and the third shaft 501 are respectively disposed with a second coupling 402 and a third coupling 502. Through the second coupling 402, the second shaft 401 is connected and fixed to one end of the transmission shaft 81 extending out of the casing 20, and through the third coupling 502, the third shaft 502 is connected and fixed to the other end of the transmission shaft 81 extending to the outside of the casing 20.

Figure 5:
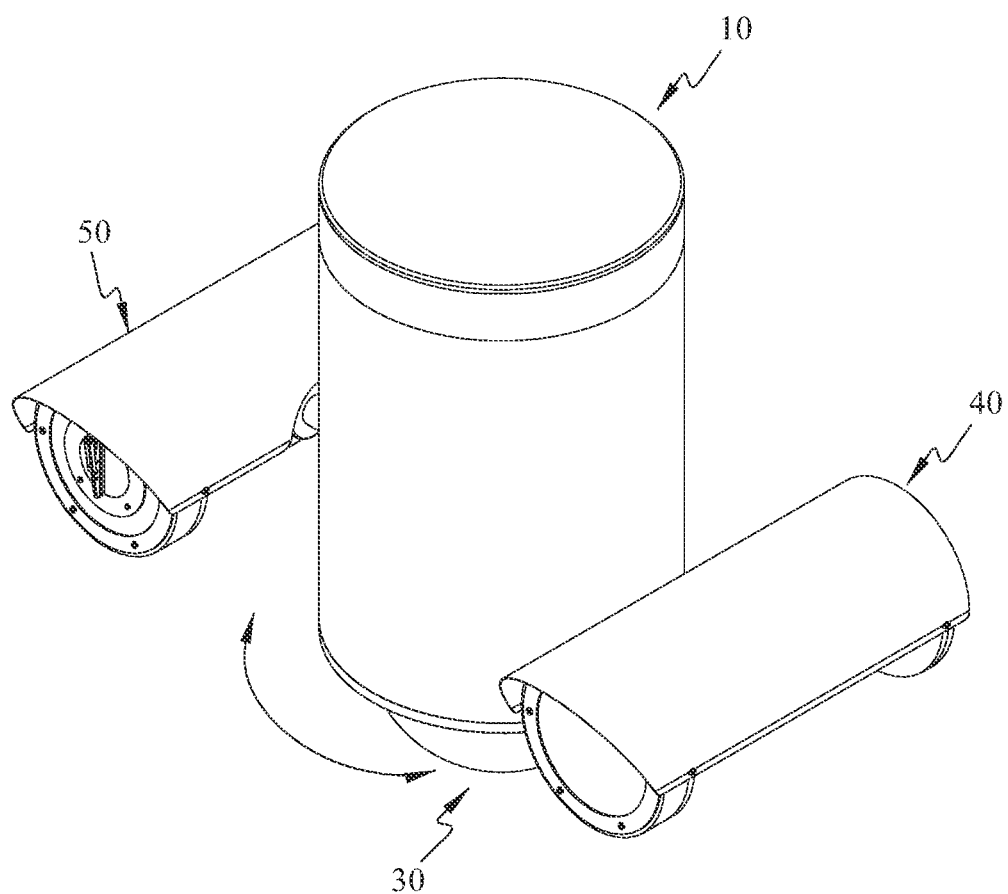
FIG. 5 is a perspective view showing the casing of the monitor device according to the first embodiment of the present invention rotating in the horizontal direction.

The first angle rotation mechanism 61 of the first embodiment is disposed on one side of the base 80, and comprises: a first motor 611 and a first gear mechanism 62, and the first motor 611 is connected to the fixing seat 10 through the first gear mechanism 62. Specifically, the first motor 611 is disposed at a position above of the base 80; the first gear mechanism 62 comprises: a first driving gear set 621, a first idler gear 622, a first driven gear 624, and a first worm screw 623, wherein the first driving gear set 621 is a stage gear composed of a large and a small gears, which is connected to the drive shaft of the first motor 611. The first idler gear 622 is connected to the first worm screw disposed on the base 80, and the first idler gear 622 meshes with the small gear of the first driving gear set 621, and the first worm screw 623 meshes with a first worm gear 101 disposed at the lower end of the fixing seat 10. The first driven gear 624 is connected to a rotating shaft of a first decoder 90 of the base 80, and the first driven gear 624 meshes with the large gear of the first driving gear set 621; accordingly, when the first motor 611 is running, through the first driving gear set 621, the first idler gear 622 and the first driven gear 624 are driven to rotate at the same time, and the first idler gear 622 drives the first worm gear 101 via the first worm screw 623, so that the base 80 and the casing 20 rotate with respect to the fixing seat 10 in the first direction (that is, the horizontal direction). That is, the first optoelectronic device 30, the second optoelectronic device and the third optoelectronic device 50 can be simultaneously driven to rotate in the horizontal direction (as shown in FIG. 5), while the first driven gear 624 drives the first decoder 90 to run at the same time, and converts the mechanical displacement of the first decoder 90 to an electrical signal, and then processes the signal through the software to detect the position and speed of the casing 20 rotating in the first direction.

Figure 6:
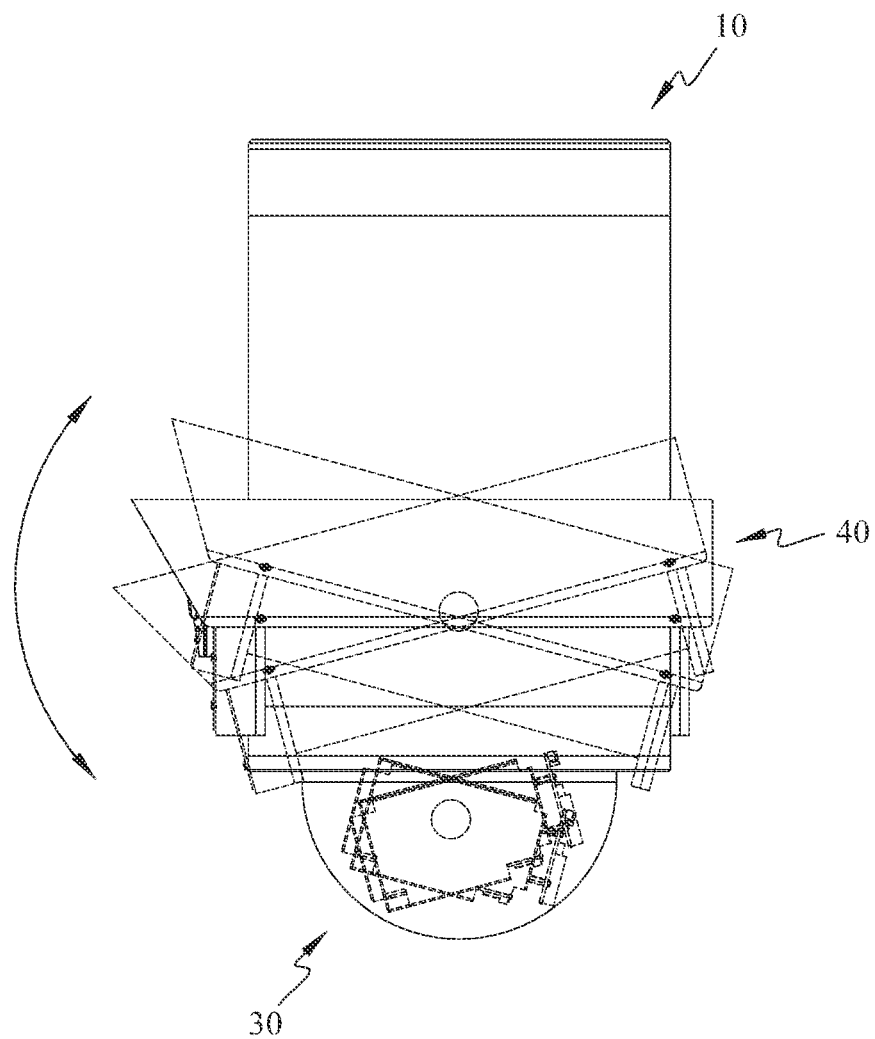
FIG. 6 is a schematic view showing the rotation of the optoelectronic device of the monitor device according to the first embodiment of the present invention in the vertical direction.

The second angle rotation mechanism 63 of the first embodiment is disposed on the other side of the base 80, and comprises: a second motor 631 and a second gear mechanism 64, and the second motor 631, through the second gear mechanism 64, drives synchronously the first optoelectronic device 30, the second optoelectronic device 40, and the third optoelectronic device to rotate in the second direction. Specifically, the second motor 631 is disposed at a position above the base 80 on the other side, and the second motor 631 and the first motor 611 are disposed in parallel with each other. The second gear mechanism 64 comprises: a second driving gear set 641, a second idler gear 642, a second driven gear 644, a second worm screw 643 and a belt driving set; wherein, the second driving gear set 641 is a stage gear set composed of a large and a small gears, which is connected to the drive shaft of the second motor 631; the second idler gear 642 is connected to the second worm screw 643 disposed on the base 80, and the second idler gear 642 meshes with the small gear of the second driving gear set 641. The second worm screw 643 meshes with a second worm gear 82 disposed on the transmission shaft 81. The second driven gear 644 is connected to a rotating shaft of the second decoder 91 disposed on the base 80, and the second driven gear 644 meshes with the large gear of the second driving gear set 641. The belt drive set comprises a driving pulley 645, a driven pulley 647, and a belt 646, wherein the driving pulley 645 is fixedly disposed on the transmission shaft 81, and the driven pulley 647 is connected to the first camera 31 of the first optoelectronic device 30 through the first shaft 648, and the belt 646 is connected between the driving pulley 645 and the driven pulley 647. Preferably, the driving pulley 645 and the driven pulley 647 are both timing pulleys, and the belt 646 is a timing belt. Accordingly, when the second motor 631 is running, the second driving gear set 641 will drive the second idler gear 642 and the second driven gear 644 to rotate at the same time, and the second idler gear 642 will drive, through the second worm screw 643, the second worm gear 82 to rotate the transmission shaft 81 in the second direction (i.e., the vertical direction or the pitch and elevation directions). The transmission shaft 81 drives the driving pulley 645 to rotate at the same time, and drives the driven pulley 647 through the belt 646 to rotate. The driven pulley 647 drives the first camera 31 of the first optoelectronic device 30 to rotate in the second direction through the first shaft 648, and the first camera 31 takes pictures of the outside through the glass cover 32. The second motor 631 can simultaneously drive the first optoelectronic device 30, the second optoelectronic device 40, and the third optoelectronic device 50 to rotate in the vertical direction (as shown in FIG. 6) via the second angle rotation mechanism 63, while the second driven gear 644 drives the second decoder 91 to run at the same time, and converts the mechanical displacement of the second decoder 91 to an electrical signal, and then processes the signal through the software to detect the position and speed of the first optoelectronic device 30, the second optoelectronic device and the third optoelectronic device 50 rotating in the second direction.

In a preferred embodiment of the present invention, the first optoelectronic device 30, the second optoelectronic device 40, and the third optoelectronic device 50 may be a camera, a thermal imager and/or a laser light respectively; however, the first optoelectronic device 30, the second optoelectronic device 40, and the third optoelectronic device 50 are not limited thereto, and can be configured as other suitable devices according to requirements.

Figure 7:
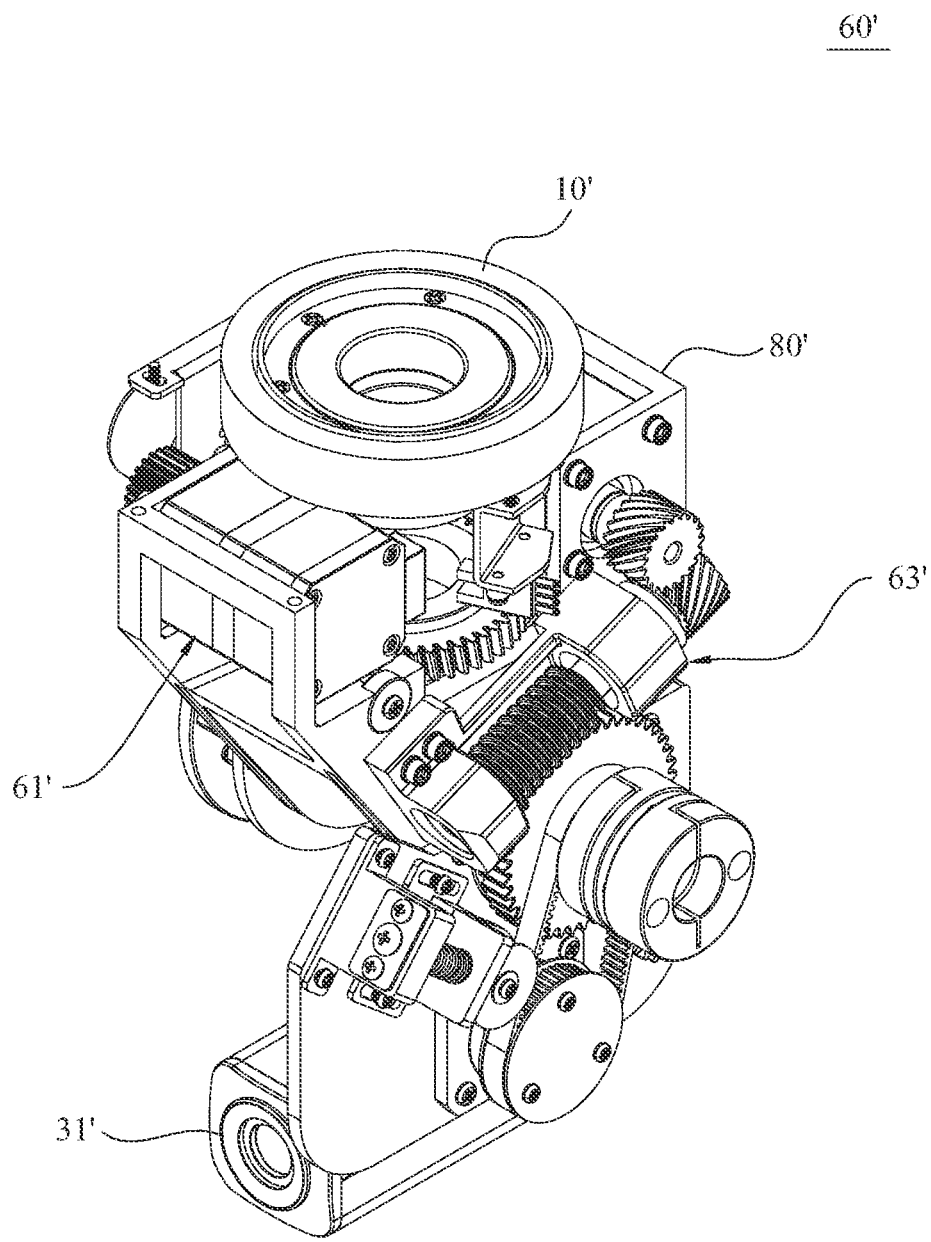
FIG. 7 is the perspective view of the transmission mechanism of the monitor device of a second embodiment of the present invention.
Figure 8:
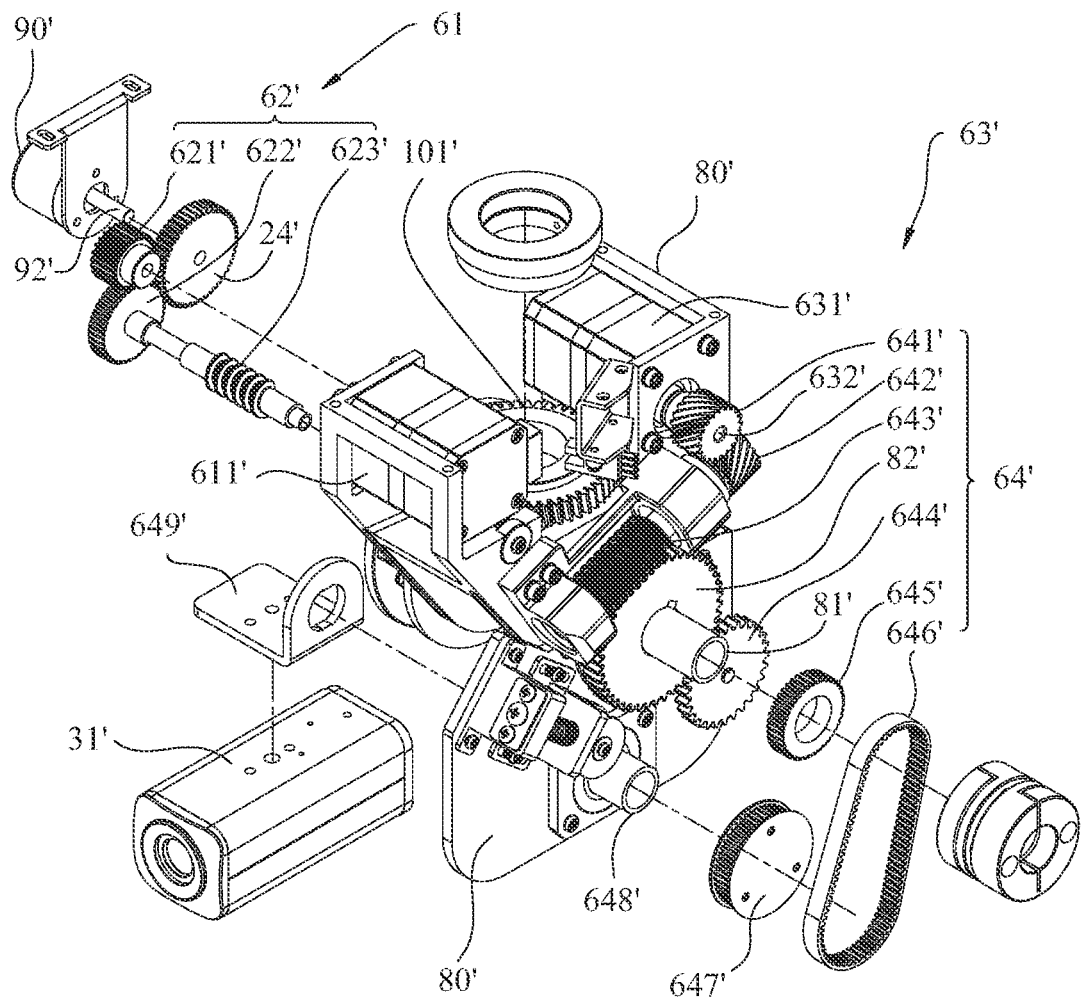
FIG. 8 is a perspective exploded view showing the component assembly relationship of the transmission mechanism of the second embodiment of the present invention.
Figure 9:
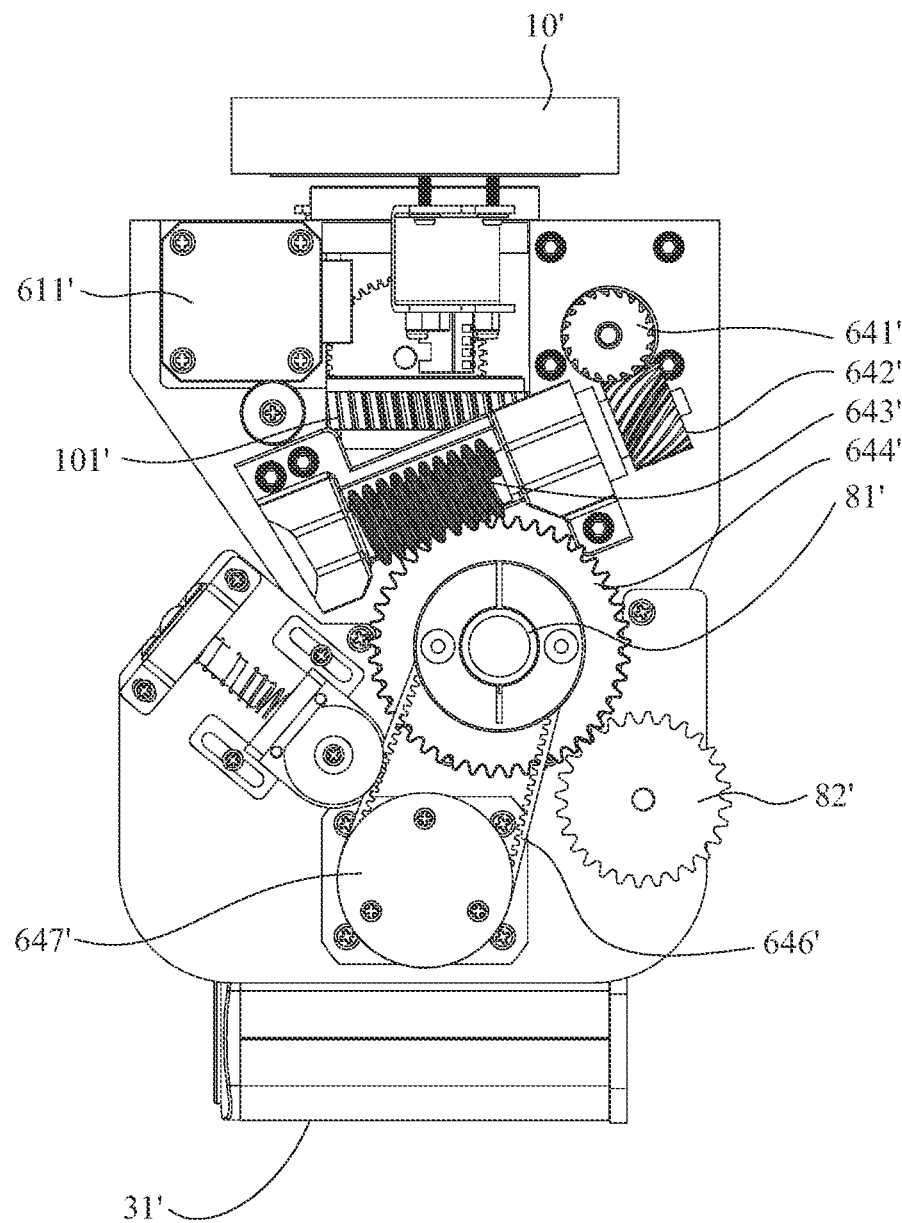
FIG. 9 is a schematic side view showing the transmission mechanism of the second embodiment of the present invention.

FIGS. 7-9 show the second embodiment of the monitor device of the present invention. The structure and operation of the second embodiment and the aforementioned first embodiment are basically the same or similar, but the configuration of the components of the transmission mechanism are slightly different, so only the difference part will be explained, and the same part will be omitted. As shown in FIGS. 7-9, the transmission mechanism 60' of the second embodiment of the present invention includes a fixing seat 80', a first angle rotation mechanism 61', and a second angle rotation mechanism 63'. Wherein, the fixing seat 10' is fixedly disposed in the accommodating space of the casing, and the first angle rotation mechanism 61' is disposed on the base 80' and connected to the fixing seat 10', so as to drive the casing to rotate back-and-forth with respect to the fixing seat 10' in a first direction. The second angle rotation mechanism 63' is disposed on the base 80' and is connected to the first optoelectronic device 30', the second optoelectronic device 40, and the third optoelectronic device 50 (see FIG. 1) to drive the first optoelectronic device 30', the second optoelectronic device 40, and the third optoelectronic device to rotate back-and-forth in a second direction in synchronization.

The transmission mechanism 60' of the second embodiment further comprises a transmission shaft 81' pivotally and horizontally disposed on the base 80', and the two ends of the transmission shaft 81' are extend out of the casing through holes disposed on both side of the casing; the second optoelectronic device 40 and the third optoelectronic device 50 are respectively connected and fixed at both ends of the transmission shaft 81' extending to the outside of the casing by means of couplings.

The first angle rotation mechanism 61' of the second embodiment is disposed on one side of the base 80', comprising: a first motor 611' and a first gear mechanism 62', and the first motor 611', through the first gear mechanism 62', is connected with the fixing seat 10'. Specifically, the first motor 611' is disposed at a position above the base 80'; the first gear mechanism 62' comprises: a first driving gear 621', a first idler gear 622', a first driven gear 624', and a first worm screw 623', wherein the first driving gear 621' is connected to the drive shaft of the first motor 611'. The first idler gear 622' is connected to the first worm screw 623' disposed on the base 80', and the first idler gear 622' meshes with the first driving gear set 621', and the first worm screw 623' meshes with a first worm gear 101' disposed at the lower end of the fixing seat 10'. The first driven gear 624' is connected to a rotating shaft of a first decoder 90' of the base 80', and the first driven gear 624' meshes with the first driving gear set 621'; accordingly, when the first motor 611' is running, through the first driving gear set 621', the first idler gear 622' and the first driven gear 624' are driven to rotate at the same time, and the first idler gear 622' drives the first worm gear 101' via the first worm screw 623', so that the base 80' and the casing 20' rotate with respect to the fixing seat 10' in the first direction (that is, the horizontal direction). That is, the first optoelectronic device 30', the second optoelectronic device 40, and the third optoelectronic device 50 can be simultaneously driven to rotate in the horizontal direction, while the first driven gear 624' drives the first decoder 90' to run at the same time, and converts the mechanical displacement of the first decoder 90' to an electrical signal, and then processes the signal through the software to detect the position and speed of the casing 20 rotating in the first direction.

The second angle rotation mechanism 63' of the second embodiment is disposed on the other side of the base 80', comprising: a second motor 631' and a second gear mechanism 64', and the second motor 631' drives, through the second gear mechanism 64', the first optoelectronic device 30', the second optoelectronic device 40, and the third optoelectronic device 50 rotate synchronously in the second direction. Specifically, the second motor 631' is disposed at a position above the base 80' on the other side, and the second motor 631' and the first motor 611' are disposed in parallel with each other. The second gear mechanism 64' comprises: a second driving gear 641', a second idler gear 642', a second driven gear 644', a second worm screw 643' and a belt driving set; wherein, the second driving gear 641' is connected to the drive shaft of the second motor 631'; the second idler gear 642' is connected to the second worm screw 643' disposed on the base 80', and the second idler gear 642' meshes with the second driving gear 641'. The second worm screw 643' meshes with a second worm gear 82' disposed on the transmission shaft 81'. The second driven gear 644' is connected to a rotating shaft of the second decoder 91' disposed on the base 80', and the second driven gear 644' meshes with the second driving gear 641'. The belt drive set comprises a driving pulley 645', a driven pulley 647', and a belt 646', wherein the driving pulley 645' is fixedly disposed on the transmission shaft 81', and the driven pulley 647' is connected to the first camera 31' of the first optoelectronic device 30' through the first shaft 648', and the belt 646' is connected between the driving pulley 645' and the driven pulley 647'. Preferably, the driving pulley 645' and the driven pulley 647' are both timing pulleys, and the belt 646' is a timing belt. Accordingly, when the second motor 631' is running, the second driving gear set 641' will drive the second idler gear 642' and the second driven gear 644' to rotate at the same time, and the second idler gear 642' will drive, through the second worm screw 643', the second worm gear 82' to rotate the transmission shaft 81' in the second direction (i.e., the vertical direction or the pitch and elevation directions). The transmission shaft 81' drives the driving pulley 645' to rotate at the same time, and drives the driven pulley 647' through the belt 646' to rotate. The driven pulley 647' drives the first camera 31' of the first optoelectronic device 30' to rotate in the second direction through the first shaft 648'. The second motor 631' can simultaneously drive the first optoelectronic device 30', the second optoelectronic device 40, and the third optoelectronic device 50 to rotate in the vertical direction via the second angle rotation mechanism 63', while the second driven gear 644' drives the second decoder to run at the same time, and converts the mechanical displacement of the second decoder to an electrical signal, and then processes the signal through the software to detect the position and speed of the first optoelectronic device 30', the second optoelectronic device 40, and the third optoelectronic device 50 rotating in the second direction.

In summary, the present invention integrates the first angle rotation mechanisms 61, 61' and the second angle rotation mechanisms 63, 63' of the transmission mechanisms 60, 60' to the bases 80, 80' and accommodated in the casing 20. In addition to reducing the overall volume, simplifying the structure, and making the whole appear simple and compact, the present invention can also control the rotation of the three optoelectronic devices in the horizontal and vertical directions at the same time, so as to obtain better, more efficient surveillance.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A monitor device, comprising:
a fixing seat, for fixing to a structure body;
a casing, having an accommodating space, with an upper end of a longitudinal axis of the casing rotatably connected to a lower end of the fixing seat, and a lower end of the longitudinal axis of the casing disposed with a first optoelectronic device;

a base, fixedly disposed in the accommodating space of the casing;

a transmission shaft, disposed on the base pivotably with horizontal axis;

a second optoelectronic device, fixedly disposed at one end of the transmission shaft, so that the second optoelectronic device being rotatably located at a first position outside the casing;

a third optoelectronic device, fixedly disposed at the other end of the transmission shaft, so that the third optoelectronic device being rotatably located at a second position outside the casing; and a transmission mechanism, disposed in the accommodating space of the casing, and the transmission mechanism comprising:

a first angle rotation mechanism, disposed on one side of the base, the first angle rotation mechanism having a first motor, the first motor being connected to the fixing seat through a first gear mechanism to drive the casing rotate back-and-forth in a first direction with respect to the fixing seat; and a second angle rotation mechanism, disposed on the base, the second angle rotation mechanism having a second motor, and the second motor being to the transmission shaft through a second gear mechanism, and connected to the first optoelectronic device through the transmission shaft so that the second motor being able to drive the first optoelectronic device, the second optoelectronic device and the third optoelectronic device synchronously to rotate back-and-forth in a second direction, wherein the first motor and the second motor being disposed above the base in parallel with each other, and wherein the first direction and the second direction are orthogonal to each other.

2. The monitor device according to claim 1, wherein the first direction is a horizontal direction, and the second direction is a vertical direction.

3. The monitor device according to claim 2, wherein the first optoelectronic device comprises a first camera and a glass cover, the glass cover is disposed at the lower end of the casing, and the first camera is disposed in the glass cover.

4. The monitor device according to claim 3, wherein:

the first gear mechanism comprises:

a first driving gear set connected to a drive shaft of the first motor;

a first idler gear connected to a first worm screw disposed on the base, and the first idler gear meshing with the first driving gear set;

a first driven gear is connected to a first decoder disposed on the base, and the first driven gear meshing with the first driving gear set;

a first worm gear, disposed on the fixing seat and engaged with the first worm screw;

the second gear mechanism comprises:

a second driving gear set connected to a drive shaft of the second motor;

a second idler gear connected to a second worm screw disposed on the base, and the second idler gear meshing with the second driving gear set;

a second driven gear connected to a second decoder disposed on the base, and the second driven gear meshing with the second driving gear set;

a second worm gear fixedly disposed on the transmission shaft and engaged with the second worm screw.

5. The monitor device according to claim 4, wherein the second angle rotation mechanism further comprises a driving pulley, a belt and a driven pulley, the driving pulley being fixedly disposed on the transmission shaft, and the driven pulley being connected to the first camera, the belt connecting the driving pulley and the driven pulley, so that the transmission shaft driving the second optoelectronic device and the three optoelectronic devices to rotate in the second direction, and through the driving pulley, the belt and the driven pulley, the first camera rotating in the second direction.

6. The monitor device according to claim 3, wherein the first gear mechanism comprises:

a first driving gear connected to the drive shaft of the first motor;

a first idler gear connected to a first worm screw disposed on the base, and the a first idler gear meshing with the first driving gear;

a first driven gear is connected to a first decoder disposed on the base, and the first driven gear meshing with the first driving gear; and a first worm gear is disposed on the fixing seat and engaged with the first worm screw;

the second gear mechanism comprises:

a second driving gear connected to a drive shaft of the second motor;

a second idler gear connected to a second worm screw disposed on the base, and the second idler gear meshing with the second driving gear;

a second worm gear fixedly disposed on the drive shaft and meshing with the second worm screw; and a second driven gear is connected to a second decoder disposed on the base, and the second driven gear meshing with the second worm gear.

7. The monitor device according to claim 6, wherein the second angle rotation mechanism further comprises a driving pulley, a belt and a driven pulley, the driving pulley being fixedly disposed on the transmission shaft, and the driven pulley being connected to the first camera, the belt connecting the driving pulley and the driven pulley, so that the transmission shaft driving the second optoelectronic device and the three optoelectronic devices to rotate in the second direction, and through the driving pulley, the belt and the driven pulley, the first camera rotating in the second direction.

* * * * *